United States Patent [19]

Flaugher et al.

[11] Patent Number: 5,346,526
[45] Date of Patent: Sep. 13, 1994

[54] APPARATUS FOR BENDING GLASS SHEETS

[75] Inventors: Jeffrey R. Flaugher, Carlton; Timothy A. Nissen, Northville, both of Mich.; Vincent N. Procaccini, Toledo; Sugato Deb, Perrysburg, both of Ohio

[73] Assignee: Libbey-Owens-Ford Co., Toledo, Ohio

[21] Appl. No.: 108,238

[22] Filed: Aug. 19, 1993

Related U.S. Application Data

[62] Division of Ser. No. 817,784, Jan. 8, 1992, Pat. No. 5,279,635.

[51] Int. Cl.$^5$ .................................................. C03B 23/03
[52] U.S. Cl. ........................................ 65/273; 65/288; 65/355; 65/356
[58] Field of Search ................. 65/273, 287, 288, 355, 65/356

[56] References Cited

U.S. PATENT DOCUMENTS

| | | | |
|---|---|---|---|
| 2,442,242 | 5/1948 | Lewis | 65/273 |
| 3,338,695 | 8/1967 | Ritter | 65/356 |
| 3,753,673 | 8/1973 | Pickard et al. | 65/273 |
| 3,854,920 | 12/1974 | Kay et al. | 65/273 |
| 4,047,919 | 9/1977 | Oelke et al. | 65/273 |
| 4,071,345 | 1/1978 | Werner et al. | 65/273 |
| 5,178,660 | 1/1993 | Wampler et al. | 65/273 |

*Primary Examiner*—Joye L. Woodard
*Attorney, Agent, or Firm*—Marshall & Melhorn

[57] ABSTRACT

A method of and apparatus for establishing a predetermined thermal profile in a glass sheet immediately prior to press bending outside the heating furnace. The press bending members are provided with arrays of heating elements that are individually or zone regulated to assist in establishing an optimum temperature profile in the glass sheet conducive to proper bending. The temperature profile established in the heated sheet by the arrays of heating elements is coordinated with that established in the furnace and subsequently, modified by heat dissipation as the glass sheet advances to the bending station to achieve the proper bending temperature. The heating elements can also be utilized to create a temperature profile in the glass sheet generally higher than that originally established in the furnace. The sheet can be held in contact with one or both of the heated press members for a brief period of time after bending to slow the cooling rate of the sheet and increase the edge strength of the marginal edge area thereof.

3 Claims, 2 Drawing Sheets

APPARATUS FOR BENDING GLASS SHEETS

This application is a Division of application Ser. No. 07/817,784, filed Jan. 8, 1992 now U.S. Pat. No. 5,279,635.

BACKGROUND OF THE INVENTION

1. Field of the Invention

The present invention relates generally to the production of curved glass sheets and, more particularly, to an improved method of and apparatus for press bending relatively thin sheets of glass.

2. Description of the Prior Art

Curved sheets of glass are commonly used as glazing closures or windows of vehicles such as automobiles and the like. For such applications, it is imperative that the sheets be bent to precisely defined curvatures determined by the configurations and sizes of the openings as well as the overall styling of the vehicle. Further, it is required that the bent sheets meet stringent optical requirements and that the viewing area of the closures or windows be free of surface defects and optical distortion that would tend to interfere with the clear viewing therethrough. Thus, it can be appreciated that not only is it required to have bending apparatus that will shape glass sheets to precise curvatures, but also that it will do so without causing serious optical defects to the surfaces thereof.

One commercial method of producing such curved sheets generally includes heating pretrimmed, flat sheets of glass to the softening temperature, press bending the heated sheets to a desired curvature between male and female mold members having complementary shaping surfaces and, finally, cooling the curved sheets in a controlled manner to either anneal or temper the glass sheets as dictated by their intended use. Such a bending technique is referred to as "press bending" and may suitably be carried out with the glass sheets oriented vertically, horizontally or obliquely.

In a mass production operation, the above operations are carried out successively while the sheets of glass are being advanced substantially continuously along a fixed path to a heating area, a bending area, and a cooling or tempering area. To achieve satisfactory temper in a glass sheet, the temperature of the glass must be above a predetermined minimum level so as to maintain the core or central portion above a deformation temperature upon being exposed to the tempering medium. The residual heat remaining in glass sheets of conventional thickness such as those having thicknesses ranging from 0.200 to 0.255 inch (5.08 to 6.48 mm), for example, is generally above such predetermined minimum level after bending for immediate advancement to the tempering area and exposure to the tempering medium. Thus, the heat initially imparted to the sheet to bring it to the proper bending temperature can also be utilized in the final heat treating tempering operation.

In recent years, however, in an effort to reduce the overall weight of the automobile as well as reduce production costs, considerable emphasis has been placed on the use of thinner glass sheets for automotive glazing purposes. Tempered side and back windows ranging in the thickness from about 0.125 to 0.156 inch (3.17 to 3.96 mm) are commonplace in today's automobile industry. While the process described above is admirably suited for the mass production of the thicker tempered glass sheets, it does not lend itself to the processing of relatively thinner tempered glass sheets because of the lesser ability of such thinner sheets to retain heat. As the thickness of the glass decreases, the rate of temperature reduction increases. Thus, the heat loss occurring between initial heating and tempering occasioned by the intermediate bending operation in accordance with the above technique brings the temperature of a thin glass sheet down to a level below the aforementioned minimum temperature at which satisfactory temper can be effected. On the other hand, overheating the thin sheets of glass during initial heating to compensate for the rapid subsequent loss of heat during bending renders the sheets extremely pliable, with the attendant loss of deformation control necessary to maintain the shape of the bent sheets within the close tolerances dictated by the automobile design and styling requirements. Moreover, such overheating tends to degrade the surface quality of the finished glass as a result of heat stains, roll deformation, pitting and the like. While attempts have been made to solve these problems in the mass production of thin, bent, tempered glass sheets, only limited success has been achieved in obtaining an acceptable degree of temper while maintaining suitable optical quality and the desired shape imparted to such thin glass sheets during bending.

In past years, the majority of laminated windshields for the automotive industry were bent by the well known gravity, or sag bending technique, wherein a pair of superimposed sheets are simultaneously bent by the forces of gravity on a suitable skeletal-type mold. The technique, although highly successful, is considerably slower and more costly than the press bending process. Moreover, recent advancements in press bending technology have resulted in most instances, in a product that is of much higher quality than that produced by gravity bending. Thus, to provide an improved product and contain costs, there has been a growing trend to bending glass for windshields, when applicable, by the press bending process.

Like the tempered side and back windows, considerable emphasis also has been placed on the use of thinner glass sheets for windshields, as thin as 0.069 in. (1.52 mm), for example. These glass sheets generally are annealed and have much more stringent optical requirements than that required for glass sheets used for the side and back glazing closures of the automobile. As previously mentioned, it is necessary to overheat the glass sheet in the furnace to compensate for the heat that is lost as it is conveyed into the cooler environment associated with the shaping station. Heating the glass sheets to temperatures exceeding the softening temperature of the glass can be especially detrimental to thinner glass sheets on the order of 0.060 to 0.102 in (1.52 to 2.60 mm) or less, for example, rendering them extremely pliable and susceptible to roll distortion. Thus, if not carefully controlled, roll distortion beyond acceptable limits may occur, resulting in a product unfit for sale.

In the typical press bending operation after the sheet is formed between the opposed bending members, the bent sheet is immediately placed on either a roll conveyor or a carrier ring for transport out of the bending station into a cooling station. The lower press member is generally of ring-type construction and in the first method supports the sheet after bending and deposits it on the roll conveyor as the press member is lowered beneath the rolls. The sheet in the latter method is supported by an upper vacuum mold and deposited on the carrier ring immediately after bending. In either instance, during the initial cooling stage the perimeter of the hot glass sheet is in contact with a cooler, substantially continuous ring which accelerates cooling at the edges of the sheet relative to the central portion. This differential cooling has an effect on the ultimate stress pattern established in the sheet after it attains room temperature. When press bending thin glass sheets for windshields, this can result in permanent high stress areas inwardly of the peripheral edge of the sheet which increases the likelihood of breakage resulting from chipping, abrasions, stone hits and the like, during subsequent use in automobiles.

Oftentimes, as dictated by the curvature of the part, it is necessary to heat a portion or portions of the sheet requiring a sharper bend to a higher temperature than the remainder of the sheet to assure satisfactory bending. A windshield with wrap-around pillar areas would be exemplary of such a part. This uneven or differential heating of the sheet further complicates matters since extreme care must be exercised to avoid overheating the entire sheet, which can result in excess crossbend or the formation of objectionable heat stain in the critical viewing area.

A similar situation requiring differential heating occurs when bending glass sheets for the fabrication of an electrically conducting windshield. Such a windshield includes an electrically conducting film used for the defogging and deicing of the vision area. A major surface of one of the sheets is provided with bus bars that provide the necessary circuitry for the subsequently applied transparent electrically conducting coating, as is well known in the art. The bus bars are typically formed of a silver frit material and are applied prior to heating and bending by a suitable process, such as silk screening, for example. Unfortunately, the silver frit has a significant effect on the heating characteristics of the glass, tending to retard the heating rate immediately adjacent the frit lines. The circuitry includes at least one bus bar which extends along one of the lateral edges of the sheet. To compensate for the slower heating rate caused by the presence of the silver frit, it is necessary to heat this portion to a higher temperature than the remainder of the sheet. Thus, it is necessary to establish a differential heating pattern across the width of the furnace to produce a uniform temperature in the sheet suitable for further processing. This has been accomplished with limited success through the regulation of the furnace heating means. However, since the sheet loses heat so rapidly upon exiting the furnace, it is difficult to maintain the sheet at the proper temperature for further processing without overheating within the furnace.

U. S. Pat. Nos. 3,753,673 and 3,854,920, both assigned to Triplex Safety Glass Company Limited, disclose a method and apparatus for controlling heat loss in a glass sheet during the bending operation to minimize "springback" on cooling. "Springback" is a term commonly used to describe the change that occurs in the shape of the glass sheet after bending resulting from the differential cooling of the two major surfaces of the sheet. One or both of the bending dies are heated to a predetermined temperature to balance the overall heat loss between the two surfaces.

One technique successfully developed to produce relatively thin tempered glass sheets is disclosed and claimed in U. S. Pat. No. 4,047,919, assigned to the same assignee as the present invention, whereby open ring-type male and female molds are provided with individually controllable gas burners for reheating at least a portion of the sheet prior to bending. The process addresses the problem of maintaining relatively thin glass sheets, after bending, at a predetermined temperature level suitable for tempering. While it has been successful for its intended purpose, it neither anticipates nor provides the necessary means to overcome the above-described problems associated with bending and tempering very thin glass while maintaining the very stringent optical requirements demanded.

SUMMARY OF THE INVENTION

The present invention alleviates the above-noted shortcomings of the prior art devices by providing an improved method of controlling the temperature of the glass sheet outside the furnace to establish in the glass sheet prior to bending a predetermined thermal profile conducive to proper bending and after bending to slow the initial cooling rate of the sheet in a manner to promote improved stress conditions in the peripheral marginal area of the glass sheet. To this end, the press members for shaping the glass sheet include heated male and female molds. The male mold is of solid construction and includes a plurality of electrical resistance heating elements embedded therein. The heating elements are disposed adjacent the shaping surface of the mold and are individually regulated to provide the desired heating effect on a glass sheet positioned therebelow. The lower female mold is of ring-type construction and includes an array of individually controllable electrical resistance heaters to supplement the heat provided by the heaters in the upper mold.

Therefore, it is a primary object of the invention to provide an improved method of establishing a predetermined temperature profile in a relatively thin glass sheet conducive to proper bending.

Another object of the invention is to provide such a method which involves establishing a temperature profile in the glass sheet inside a furnace and controlling the temperature of the glass sheet prior to bending outside the furnace to achieve a predetermined temperature profile conducive to proper bending.

Another object of the invention is to provide such a method in which the temperature of the glass sheet is controlled outside the furnace by means of at least one heated bending member.

Another object of the invention is to provide such a method in which the heated bending member includes a plurality of individually regulated heating elements for selectively heating portions of the glass sheet to the temperature desired.

Another object of the invention is to provide such a method in which the temperature profile in the glass sheet established in the furnace is generally higher than the predetermined temperature profile conducive to proper bending.

Yet another object of the invention is to provide such a method in which the temperature profile in the glass sheet established in the furnace is generally lower than the predetermined temperature profile conducive to proper bending.

Still another object of the invention is to provide an improved method for increasing the edge strength of a bent glass sheet.

A further object of the invention is to provide such a method in which the glass sheet is retained in contact with at least one heated bending member for a predetermined period of time after bending so as to retard the rate of temperature reduction of the glass sheet and thereby to lower the peak tensile stress in the peripheral margin thereof.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DETAILED DESCRIPTION OF THE PREFERRED EMBODIMENT

Figure 1:
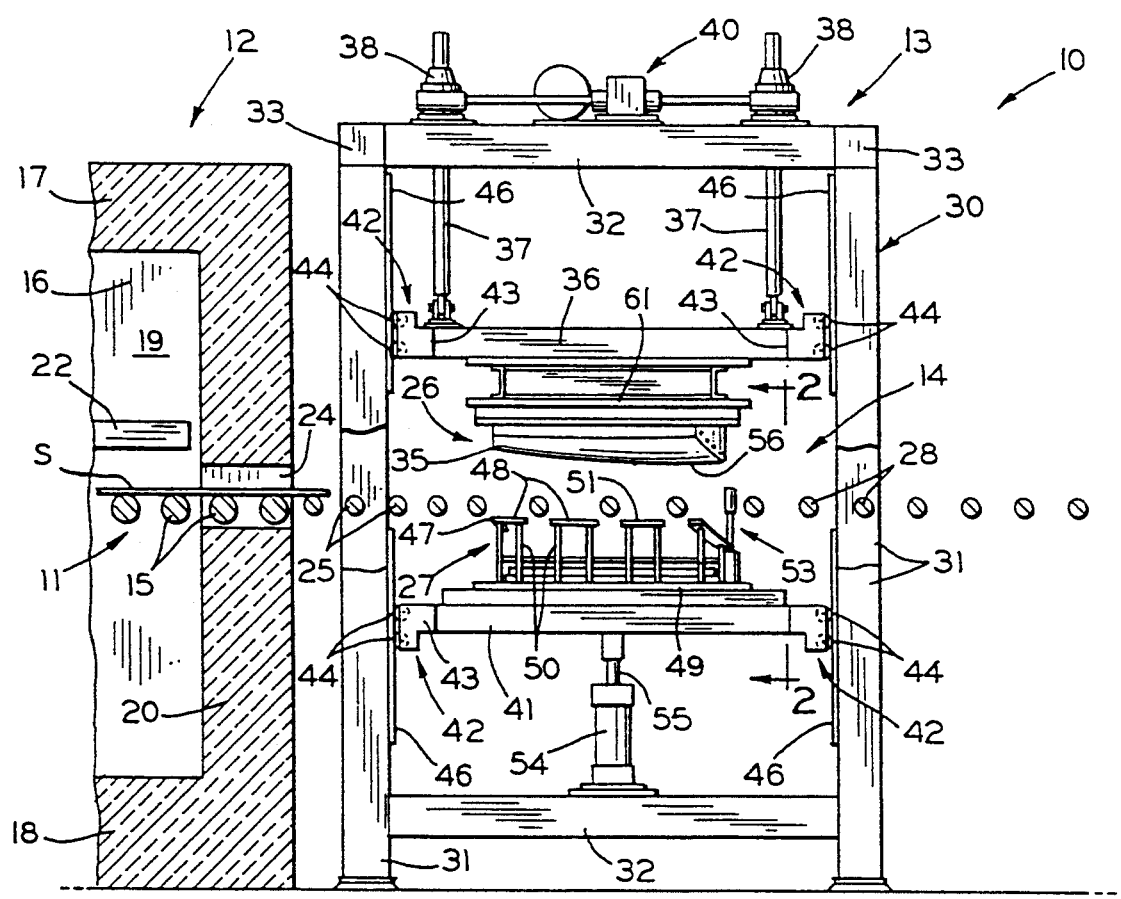
FIG. 1 is a side elevational view of a press bending apparatus embodying the novel press bending members of the invention.

With reference now to the drawings, there is illustrated in FIG. 1, a glass sheet press bending apparatus comprehensively designated 10, constructed in accordance with the invention. The apparatus 10 includes a continuous conveyor system 11 adapted for supporting and conveying glass sheets S along a generally horizontal path through a furnace 12 for heating the sheets to substantially their softening point or bending temperature, a press bending station 13, embodying the novel bending means 14 of the invention for bending the sheets to the desired curvature and thereafter to subsequent stations (not shown) where the heated, bent sheets are appropriately cooled so as to be tempered or annealed for subsequent fabricating steps. It is to be understood that while the invention is described herein in connection with a horizontal bending apparatus, it is not restricted to such apparatus but may as well be employed in a vertical press bending apparatus or other apparatus utilizing opposed press bending members for shaping sheets of glass or the like.

Typically, the glass sheets S are heated in a controlled manner while being conveyed through the furnace 12 on aligned conveyor rolls 15 forming part of the conveyor system 11. The furnace 12 may be of any conventional construction and is illustrated in FIG. 1 as a tunnel-type furnace having a heating chamber 16 defined by a roof 17, a bottom wall 18, opposite side walls 19 and an end wall 20. The heating chamber 16 is heated by suitable heating means such as gas burners or electrical resistance heaters (not shown) disposed in the top and side walls and suitably regulated to provide a desired heating pattern for the glass sheets moving therethrough. Should it be necessary or desired, a supplemental differential heating apparatus 22 may be provided at selected locations along the length of the furnace to modify the heating capability of the furnace. Such a differential heating assembly is disclosed and described in detail in copending application Ser. No. 07/355,169, filed May 22, 1989,now U.S. Pat. No. 4,952,227, which disclosure is incorporated herein by reference and to which reference may be had for a full understanding of the device.

The sheets S are carried through the heating chamber 16 on the conveyor rolls 15 of the conveyor system 11 which extends from the entrance end (not shown) of the furnace 12 through an opening 24 in the end wall 20. The glass sheets S are heated to substantially the softening point of the glass as they are conveyed through the controlled temperature environment of the furnace 12. Upon exiting the furnace through opening 24, the sheets S are received on a second series of conveyor rolls 25 for movement into and within the bending station 13 between opposed upper and lower press members 26 and 27, respectively, which impart the desired curvature thereto. After the sheets are bent, they are advanced along the conveyor 11 on a third series of rolls 28 which convey the bent glass sheets S to the next processing step (not shown), typically tempering or annealing of the sheets.

The press bending station 13, with reference to FIG. 1, comprises a skeletal framework 30, generally in rectangular parallelpiped form, including upstanding corner posts 31 interconnected at their top and bottom by longitudinal beams 32 and transverse beams 33 to form a rigid box-like structure. The rolls 25 of the bending station are drivingly mounted upon the framework in a conventional manner (not shown). Mounted within the framework 30 for reciprocating relative movement toward and away from each other are the upper and lower press members 26 and 27 which are provided with opposed complemental shaping surfaces conforming to the curvature to which the sheets are to be bent.

The upper or male press member 26, as will be hereinafter more fully described, comprises a shaping element 35 carried upon a platen frame 36. The platen frame is preferably constructed to be vertically adjustable in order to accommodate glass parts bent to varying degrees of curvature between the opposed press members. Accordingly, the platen frame 36 is operatively attached at each of its corners within the framework 30 to the lower ends of screw jack rods 37 of associated screw jacks 38 carried on a framework comprised by the beams 32 and 33 atop the framework 30. Also carried atop the framework is a motorized drive unit 40 adapted to drive the screw jacks 38 in unison for retracting or extending the rods 37 to correspondingly raise or lower the platen frame 36 and the shaping element 35 carried thereby.

The lower or female press member 27, as will be hereinafter described, is mounted for vertical reciprocal movement and is carried upon a platen frame 41 similar in construction to the platen frame 36. In order to insure that the platen frames move freely up and down along a precise vertical path within the framework 30, they are provided at each of their corners with stabilizing roller guide means 42. The guide means 42 include brackets 43 affixed to the corners of the platen frames 36 and 41. Each bracket carries a plurality of rollers 44 suitably mounted to rollingly engage track plates 46 affixed to adjacent angularly disposed faces of the associated corner posts 31. The platen frames are thus held firmly against lateral movement while being able to move freely up and down along a vertical path.

The lower press member 27 is of conventional outline or ring-type construction, and normally resides in a rest position below the rolls 25 of the bending station 13. The press member 27 is mounted for vertical reciprocal movement to lift a sheet S from the rolls 25 and press it against the upper press member 26, and then return the bent sheet to the rolls 25 for advancement out of the bending station 13 and onto the rolls 28 for further processing.

In order to permit the lower or female press member 27 to pass upwardly between the rolls 25 for lifting the sheets therefrom, the press member comprises a ring-type shaping rail 47 formed of a plurality of segments 48 spaced apart sufficiently to pass between adjacent ones of the rolls 25. The individual segments 48 are affixed in spaced relation to a base member 49 by connecting rods 50 and conform in outline to the glass sheet to be bent, and include an upwardly directed shaping surface 51 to impart the desired curvature to the sheet. While the conveyor rolls 25 are shown as being straight and the shaping rail 47 shown and described as being formed of a plurality of segments, it is appreciated that the rolls can be contoured and the shaping rail continuous or uninterrupted as disclosed in U.S. Pat. No. 4,670,036 which is assigned to the same assignee as the present invention. The particular outline of the shaping rail 47, as well as the specific curvature of the shaping surface 51, of course, are dictated by the predetermined finished shape of the glass sheet being bent and can vary as desired. A spaced pair of vertically reciprocal stop means 53 (only one shown) is conventionally provided on the base member 49 between adjacent one of the rolls 25 for precisely positioning incoming glass sheets S relative to the upper and lower press members 26 and 27, respectively.

The base member 49 is carried by the lower platen frame 41 and is movable therewith. A fluid actuated cylinder 54 is mounted beneath the platen frame 41 and carried by the beams 32. The cylinder includes a piston rod 55 affixed at its distal end to the platen frame 41 for reciprocally moving the lower or female press member 27 between its retracted position, whereat the shaping rail 51 is below the conveyor rolls 25, and its raised position whereat the ring segments are adapted to lift a heated sheet S from the conveyor rolls and press it against the male press member 26 between the complementary shaping surfaces of the male element 35 and the shaping rail 51, to bend it to a predetermined curvature. Upon completion of bending, the piston rod 55 is retracted to lower the platen frame 41, thereby retracting the shaping rail 51 beneath the conveyor rolls 25 and depositing the bent sheet thereon.

Figure 2:
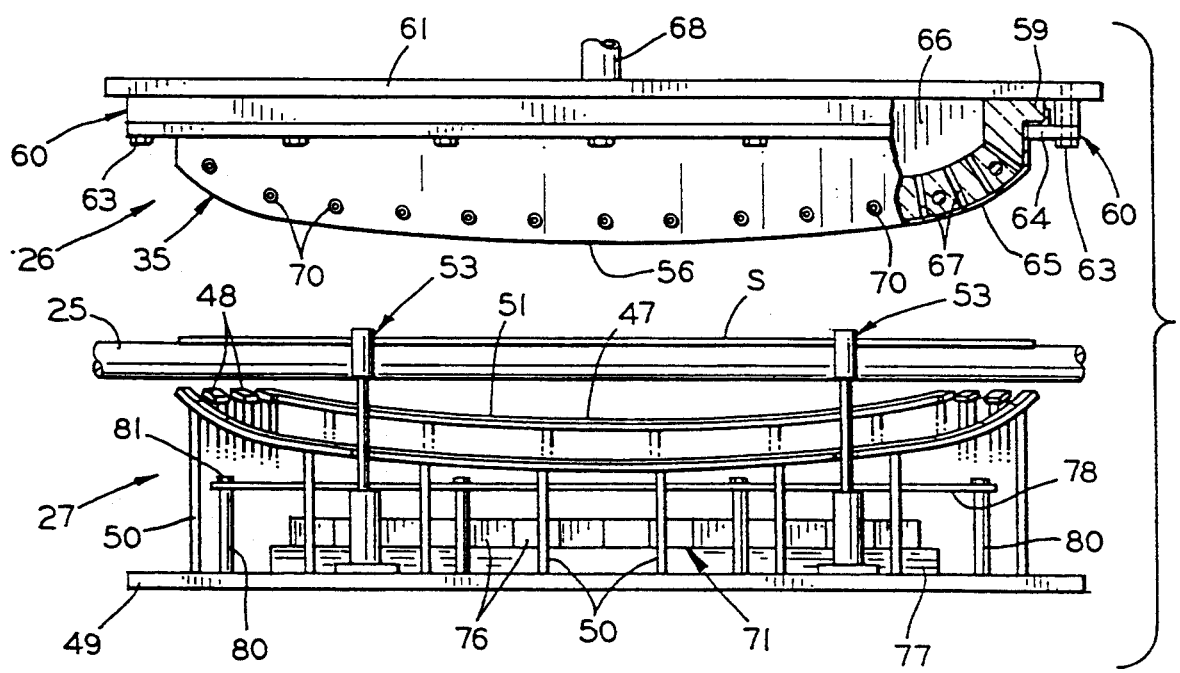
FIG. 2 is an enlarged, front elevational view taken substantially along line 2—2 of FIG. 1, with parts removed for purposes of clarity.
Figure 3:
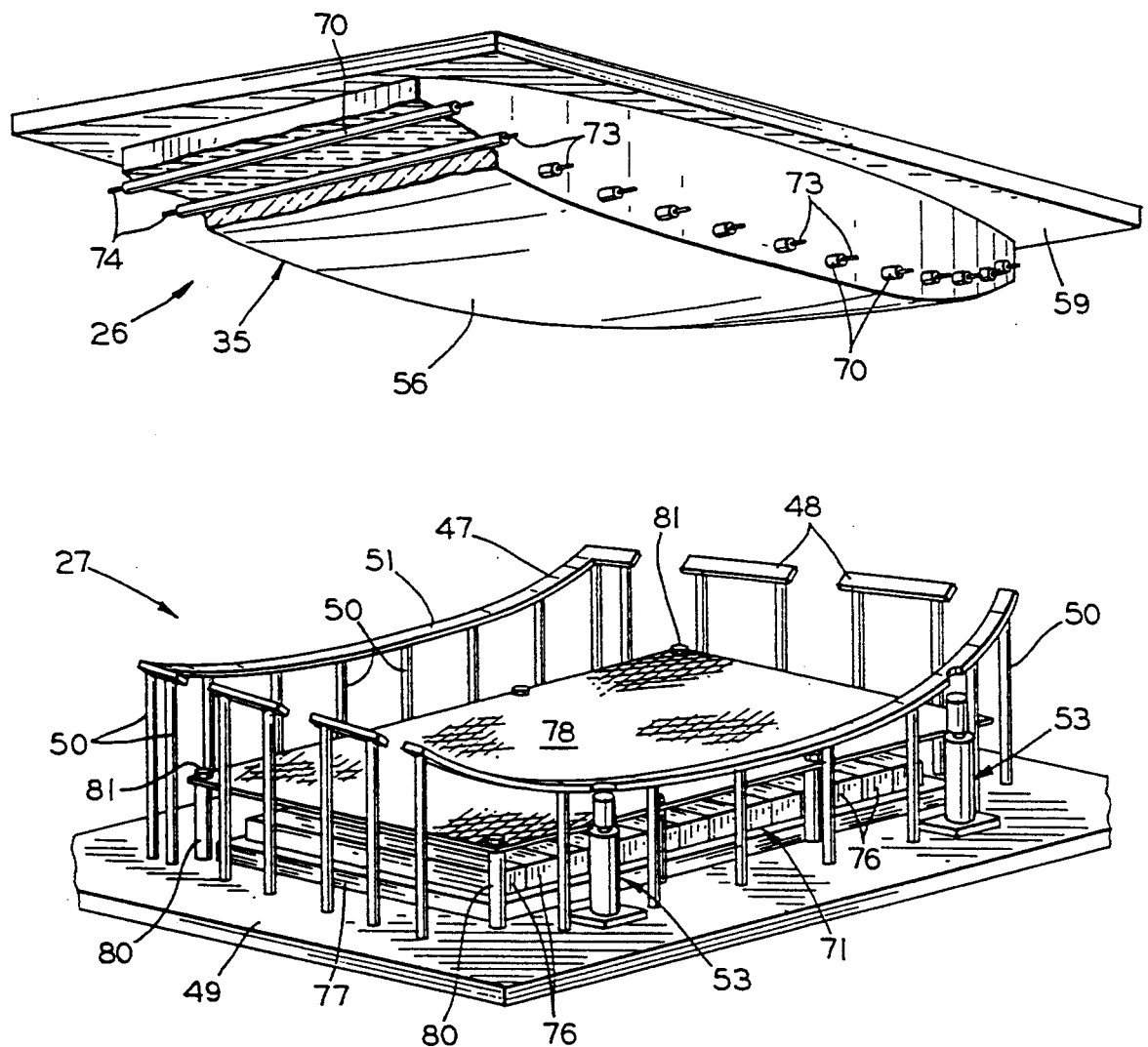
FIG. 3 is a perspective view of the press members of the invention more clearly illustrating the heating means.

As best illustrated in FIGS. 2 and 3, the upper male press member 26 of the invention is of the so-called solid or continuous type. To that end, the male shaping element 35 includes a continuous glass shaping surface, identified generally at 56, having a configuration complementary to that of the lower female press member 27. The shaping element 35 is formed of any suitable material capable of withstanding the elevated temperatures to which it is subjected and may, for example, advantageously be a refractory material. An outwardly extending flange 59 integrally formed along, preferably, the entire perimeter of the shaping element 35, cooperates with a plurality of L-shaped brackets 60 for mounting the shaping element to a support plate 61 suitably attached to the upper platen frame 36. The brackets 60 are secured to the support plate 61 by suitable fasteners 63, and include a leg portion 64 that engages the flange 59, urging it upwardly against the support plate 61 to securely clamp the shaping element 35 thereto. To provide a resilient non-abrasive surface for contact with the heat softened glass sheet and to provide insulation, the shaping surface 56 is covered with a sheet 65 of heat-resistant cloth, such as woven or knit fiberglass or the like. The cloth sheet 65 is stretched tautly over the shaping surface 56 and held in place by any suitable means such as the mounting brackets 61, as shown in FIG. 2.

A chamber 66 may be formed in the shaping element 35, if desired, to serve as a manifold for a positive or negative air pressure to assist in the shaping and handling of the glass sheets. To that end, the shaping surface 56 is provided with a plurality of air passages and the shaping element 35 with a conduit 68 in communication with the chamber 66 and a source of air under pressure. The air passages may be in the form of drilled holes 67 or a porous or less dense refractory material can be chosen for the shaping element that would permit a uniform flow of air along the shaping surface without the need for the drilled passageways. A negative air pressure, or vacuum, thus can be provided on the shaping surface of the upper mold to assist in conforming the sheet thereto. The vacuum can then be utilized to support the sheet as the lower mold is lowered and a carrier ring is moved into position to transport the sheet out of the press area, as is well known in the art.

As indicated previously, numerous problems are associated with the successful bending of very thin glass at a station outside the furnace. Foremost of these is the inherent loss of heat from the glass as it travels from the furnace to the relatively cooler environment of the bending station. The sheets are initially heated in the furnace to a temperature above the softening temperature of the glass to compensate for this heat loss and ensure that the glass arrives at the bending station at the appropriate temperature to promote satisfactory bending and subsequent heat treatment or tempering. This has proven successful when fabricating glass sheets of conventional thicknesses, on the order of 0.200 inch (5.08 mm) or more. However, it does not lend itself readily to the fabrication of thinner glass sheets ranging in thickness, for example, from 0.060 to 0.102 inch (1.52 to 2.60 mm), due to the rapid rate of heat loss associated with sheets of this character. Thus, to overheat such thinner glass sheets to still higher temperatures to compensate for the greater heat loss would create heat stains, roll distortion and the like, tending to degrade the surface quality and optical characteristics of the glass sheets. This is of primary concern when producing glass for the fabrication of windshields, wherein the optical requirements are even more stringent than for the side and rear windows of the automobile.

The present invention alleviates the above problems by providing press bending members outside the furnace incorporating heating elements that can quickly and efficiently reheat a glass sheet initially heated in a furnace. The heating elements of the associated press members can be utilized to either control the rate of heat dissipation, or cooling, of the heated glass sheet or to increase the temperature thereof, when positioned between the opposed press members. In the former instance, the output of the heating elements is regulated to provide temperatures higher than ambient so as to retard the rate of heat loss from the sheet. Generally speaking, the higher the temperature the slower the heat loss from the glass sheet. In the latter instance, the heating elements are utilized to increase the temperature of the sheet by replacing the heat dissipated as the sheet moves from the furnace to the bending area. It is contemplated that the heating elements may also be used to heat the sheet to temperatures exceeding that originally established in the furnace. In each instance, the purpose of the invention is to maintain the glass sheet at reduced temperatures, prior to entering and within the bending station, to preserve the pristine quality of the surface. The heating elements are arranged in a specific pattern, or array, and can be controlled individually or in zones to create a predetermined heating profile to control heat dissipation or boost heating in the glass sheet.

In accordance to the present invention, when shaping glass sheets requiring an uneven or differential temperature profile, a first predetermined temperature profile is initially established in the glass sheet inside the furnace. This temperature profile is generally greater than that required for proper bending to compensate for the inherent heat loss in the sheet after it exits the furnace. A second predetermined temperature profile is created in the heating elements associated with the bending members to control the rate of heat dissipation in the glass sheet while it is positioned between the two bending members. Although not limited thereto, the temperature profile associated with the bending members is generally proportionately lower than that established in the glass sheets in the furnace. The temperature patterns in the furnace and the bending members are coordinated to provide a suitable thermal profile in the glass sheet conducive to proper bending.

The heating elements associated with the bending members can also be utilized to create a predetermined differential temperature profile in a glass sheet after it has been heated to a uniform temperature in the furnace. This can be accomplished by controlling the rate of heat dissipation from the glass sheet, as well as by boost heating the glass sheet. As will be readily appreciated, by exposing the uniformly heated glass sheet to a differential temperature profile at the bending member, the glass sheet will assume a temperature profile commensurate with that to which it is subjected at the bending member. This will be true whether the heated bending member is used to control heat dissipation or to elevate the temperature of the glass sheet.

The ability to create a differential thermal profile in a glass sheet is particularly advantageous, for example, when shaping relatively thin glass sheets for windshields that have pillar areas with substantially sharper radii than the central portion of the sheet. As previously discussed, to produce a satisfactory bend, these sharply curved areas need to be heated to relatively high temperatures, exceeding the softening point of glass, to compensate for heat loss as the glass sheet is transported to the bending station. This, in turn, has an adverse effect on the surface quality and optical characteristics of the glass. According to the present invention, the need to heat the glass sheets to such extreme temperatures in the furnace is avoided. The glass sheet is heated to a predetermined temperature range in the furnace, generally below that which can cause surface defects, and reheated in a controlled manner in the press area to achieve the final optimum bending temperatures immediately prior to shaping. The glass sheet, therefore, being at lower temperatures as it is conveyed to the shaping station, is less susceptible to marring. Moreover, the individual controls incorporated in the heating units of the press member, as well as those in the furnace, provide the necessary means for creating a differential thermal profile in the sheet of glass if needed. Thus, the higher temperatures necessary to produce the smaller radius bends of the pillar areas can be confined to that portion, while the central portion is maintained relatively cooler to preserve the required optics. Of course, the same is true if a sharper radius resides in an area other than the pillar areas.

The need for differential heating of a glass sheet is also quite evident in the fabrication of electrically conducting heated windshields wherein the heating characteristics of the glass are greatly affected by the bus bars that provide the circuitry for the windshield. The bus bars tend to retard the heating rate of the glass in the area immediately below and to the sides thereof, requiring a higher heating rate than is normally needed to obtain a given temperature. Thus, for example, to achieve a uniform temperature in a sheet of glass having a bus bar disposed on one of its major surfaces, it is necessary to apply more heat to the area adjacent the bus bar than to the remainder of the sheet.

Another area of concern, most notable when processing thinner glass sheets, is the uneven cooling of the sheet when left uncontrolled after bending. The perimeter of the sheet dissipates heat more rapidly than the central portion, giving rise to a tensile stress profile that peaks just inboard the perimeter of the sheet, resulting in an edge condition making the sheet more susceptible to handling breakage after attaining thermal equilibrium. The problem is more pronounced when the sheet is supported in typical fashion immediately after bending on a substantially cooler, lower ring-type press member or carrier ring. The rate of heat dissipation at the perimeter of the sheet is accelerated due to contact with the cooler ring surfaces, creating an exaggerated stress profile that peaks just inboard of the ring location and drops off rapidly toward the interior of the sheet.

The heated press members of the invention can also be effectively employed to control the rate of heat dissipation in the glass sheet after bending in a manner to alleviate the above cooling problem and enhance the edge strength of the sheet. Retaining the sheet in contact with either one or both of the heated press members for a controlled period of time after bending will provide a more uniform cooling of the sheet, resulting in a stress profile having reduced peak tensile stress areas. The period of time during which the sheet should remain in contact with one or both of the press members is a function of glass thickness, and generally is less than 10 seconds for glass sheets on the order of 0.060 to 0.102 in. (1.52 to 2.60 mm) thick. By way of example, it has been found that holding a 0.090 in. (2.2 mm) thick glass sheet against the heated surface of a solid male press member for a period of approximately 4 seconds after the bending process is completed, provides a more uniform initial cooling rate in the glass sheet. After the sheet has undergone this initial cooling procedure, it can be placed on a relatively cooler ring-type support surface without significant detriment to the stress distribution profile of the sheet. This controlled cooling of the sheet immediately after bending results in a glass sheet after it has ultimately reached thermal equilibrium, having its peripheral edges in compression and a lower tensile stress profile inwardly of the perimeter.

In accordance with the present invention, as best illustrated in FIGS. 2 and 3, the upper press member 26 is provided with a plurality of heating elements 70 and the lower press member 27 with a radiant-type heating assembly 71, as will hereinafter be described. The heating elements 70 are of any suitable electrical resistance-type that may be embedded in the refractory shaping element and capable of reaching temperatures in the range of 1000°–1200° F. (538°–649° C.), for example. This will produce temperatures on the order of 700°–800° F. (371°–427° C.) at the shaping surface 56, which generally is sufficient to provide the necessary latitude for effectively controlling heat dissipation in a glass sheet according to the present invention. Of course, when employed to reheat a glass sheet or a portion thereof to its bending temperature, i.e., 1000°–1200° F. (538°–649° C.), it is necessary to use heating elements that are capable of producing these higher temperatures in the shaping surface. The heating elements are located relatively close, and generally parallel, to the shaping surface to provide for the most efficient operation, whereby, the shaping surface 56 can be brought to the desired temperature in a minimum response time. The heating elements 70 can be cast in place when the shaping element 35 is formed, or suitable openings may be provided by drilling or boring through the refractory element after it has been cast. Each of the heating elements 70 is conventionally connected by associated leads 73 and 74, to a suitable control unit (not shown) for regulating the power to each heating element. The heating elements may be grouped into zones, if desired, for simpler operation. Thermocouples (also not shown) may also be conveniently located in the shaping element 35 to provide temperature readings at selected locations thereof.

The heated male mold of the present invention alleviates many of the previously mentioned problems associated with bending thin glass by providing a relatively simple and effective means for heating a sheet of glass immediately before it is bent, thus eliminating the need for vastly overheating relatively thin glass in the furnace to compensate for heat loss as it travels to the bending station. Furthermore, the heating elements 70 are individually or zone controlled and, if desired, can be selectively energized to maintain or enhance a thermal profile in a glass sheet initially established in the furnace, as well as create a predetermined temperature pattern or thermal profile in a generally uniformly heated sheet of glass. The heated male also can be connected to a source of vacuum to momentarily hold the glass sheet against the heated shaping surface after bending to slow the cooling rate of the sheet and enhance the edge strength thereof.

The radiant-type heating assembly 71 of the lower press member 27 may be utilized, if needed, to supplement the heating provided by the upper heated press member 26. The heating assembly 71 is preferably in the form of an array of elongated strips or panels 76, each provided with a conventional heating means such as an embedded nickel wire resistance heater (not shown). The panels 76 are mounted on an insulating board 77 and are aligned generally parallel to the path of travel. Preferably, the number of panels 76 is such as to substantially fill the area encompassed by the shaping rail 47. A rigid, openmesh stainless steel shield 78, or the like, is supported above the array of panels 76 by a plurality of posts 80 and fasteners 81 to protect the panels from accidental damage due to falling broken glass and the like. The heating assembly 71 is suitably connected to a conventional control unit (not shown) that permits individual control of each of the heating panels 76 to regulate the heat output and establish a predetermined temperature profile across the heating assembly 71, much the same as in the upper shaping element 35.

It is to be understood that the form of the invention herein shown and described is to be taken as a preferred embodiment only of the same, and that various changes in the size, shape and arrangement of parts, as well as various procedural changes may be made without departing from the spirit of the invention or the scope of the following claims.

What is claimed is:

1. Apparatus for press bending glass sheets comprising, a furnace for heating a sheet of glass to substantially the softening point thereof, conveyor means for supporting and conveying said heated sheet along a generally horizontal path from said furnace toward and between opposed lower and upper horizontally disposed press members located outside said furnace and having complemental shaping surfaces, said lower press member including a ring-type shaping rail mounted upon a base and having an upwardly directed peripheral shaping surface, said upper press member including a refractory shaping element having a continuous shaping surface complementary to said shaping surface of said lower press member, an array of elongated radiant heating strips mounted on said base beneath said shaping rail and aligned generally parallel to the path of movement of said sheet, means for individually regulating the heat output of each said radiant heating strip for establishing a predetermined temperature profile across the array of heating strips, a plurality of spaced, elongated electrical resistance-type heating elements embedded in said refracting shaping element of said upper press member, said heating elements being spaced across said shaping element and aligned generally parallel to said path of movement and to said shaping surface, and means for regulating the power supplied to each said heating element for providing a predetermined temperature across said shaping surface.

2. Apparatus for press bending glass sheets as claimed in claim 1, including an open-mesh shield supported on said base above said radiant heating strips and beneath said shaping rail.

3. Apparatus for press bending glass sheets as claimed in claim 1, including a sheet of heat-resistant cloth stretched over said shaping surface.

* * * * *